Sept. 9, 1969  MASAO HORI ET AL  3,466,154
METHOD OF SEPARATING A DISPERSED PHASE FROM A MIXED-PHASE
FLUID SYSTEM BY ELECTROMAGNETIC FORCE
Filed July 29, 1964  5 Sheets-Sheet 1

INVENTORS
MASAO HORI, TADATO FUJIMURA, KINICHI TORIGAI, YOSHIHIRO OHUCHI
BY Oldham & Oldham
ATTORNEYS INVENTORS
MASAO HORI, TADATO FUJIMURA, KINICHI TORIGAI, YOSHIHIRO OHUCHI
BY Oldham & Oldham
ATTORNEYS Sept. 9, 1969  MASAO HORI ET AL  3,466,154
METHOD OF SEPARATING A DISPERSED PHASE FROM A MIXED-PHASE
FLUID SYSTEM BY ELECTROMAGNETIC FORCE
Filed July 29, 1964  5 Sheets-Sheet 4

INVENTORS
MASAO HORI, TADATO FUJIMURA, KINICHI TORIGAI, YOSHIHIRO OHUCHI
BY
Oldham & Oldham
ATTORNEYS

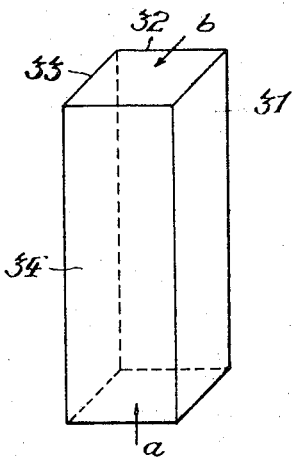
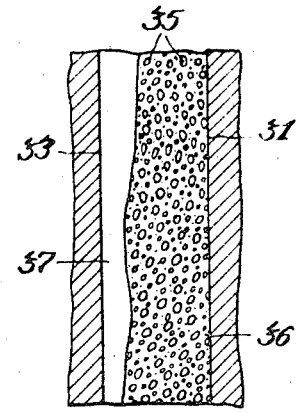
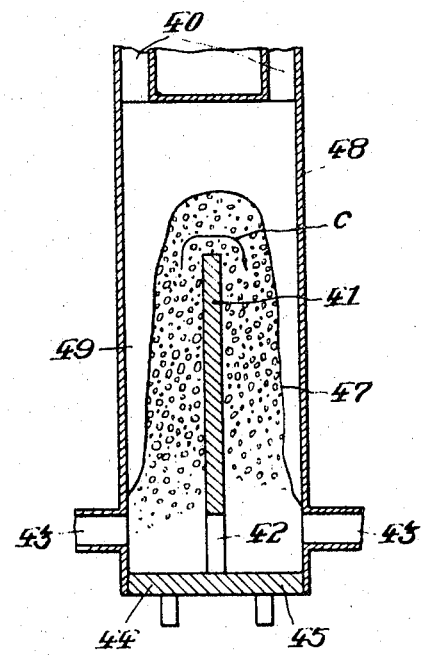

United States Patent Office 3,466,154
Patented Sept. 9, 1969

3,466,154
METHOD OF SEPARATING A DISPERSED PHASE FROM A MIXED-PHASE FLUID SYSTEM BY ELECTROMAGNETIC FORCE
Masao Hori, Tadato Fujimura, and Yoshihiro Ohuchi, Tokai-mura, and Kinichi Torigai, Mito-shi, Japan, assignors to Nihon Genshiryoku Kenkyo-sho, Tokyo, Japan
Filed July 29, 1964, Ser. No. 385,979
Claims priority, application Japan, Aug. 27, 1963, 38/45,082, 38/45,083, 38/45,084, 38/45,085
Int. Cl. B03c 1/00; C01g 56/00; G21c 19/42
U.S. Cl. 23—317                    1 Claim

ABSTRACT OF THE DISCLOSURE

A method of classifying different specific gravity particles of oxides of a nuclear fission product comprising forming a continuous phase of electrically conducting liquid from a mixture of molten sodium and potassium and disbursing in such continuous phase the oxides resulting from nuclear fission and including uranium oxides and plutonium oxide and lighter oxides. Electrical forces are applied to the continuous phase to produce an electromagnetic effect in a vertical direction that acts upon the fluid in such a manner that the dispersed phase can be moved relative to the continuous phase and wherein the action upon the oxides can be varied to cause the lighter oxides to rise and be removed after which the electromagnetic effect can be increased to float the heavier oxides for recovery, or such oxides can be obtained from the continuous phase.

---

This invention relates generally to separation of materials and particularly to methods of separating a dispersed phase from a mixed-phase fluid by electromagnetic force.

The present invention is principally based upon the fact that, when a mixed-phase fluid including a continuous phase of electrically conducting liquid and a dispersed phase in the form of finely divided particles or bubbles suspended in the liquid is subjected to a magnetic field and an electric current passed through the mixed-phase fluid, the dispersed and continuous phases are acted upon by electromagnetic forces corresponding to their electrical conductivities. Under the action of such differential electromagnetic force, the dispersed phase will obtain a velocity relative to the continuous phase which is different from that obtained when the phases are placed under gravity alone. By utilization of this phenomenon, it has been found that a dispersed phase of material in a continuous liquid phase can, irrespective of the density of the material, be caused to rise or fall through the latter without the necessity of controlling the density of the liquid simply by applying to the mixed-phase fluid an electromagnetic force in an appropriate sense and magnitude. According to the present invention, this fact is utilized for separation of a dispersed phase of material from a mixed-phase fluid.

According also to the present invention, the above effect of an electromagnetic force upon a mixed-phase fluid is utilized for classification of particles, purification of molten metal, casting of ingots and other metal masses, and boiling of liquid. Additionally, in performing the method of the present invention, the electromagnetic effect can be obtained either by a combination of a D.C. magnetic field (as obtained with a permanent magnet or an electromagnet) and a D.C. current or by a combination of an A.C. electromagnet and an A.C. current.

The present invention will now be described in further detail with reference to the accompanying drawings, which illustrate the principles and some practical applications of the present invention and in which:

FIG. 10 is a perspective illustrating the outline of a boiling apparatus embodying the principles of the present invention;

FIG. 11 is a fragmentary vertical cross-sectional view of same; and

FIG. 12 is a vertical cross-sectional view of one practical example of the apparatus shown in FIGS. 10 and 11.

The present invention will be described hereinafter in connection with its respective applications.

I.—Classification of particles

A method of classifying particles involving different densities has been previously known in which the particles are mixed with a liquid to allow a portion of the particulate material to sink or float through the liquid due to the difference in density between the liquid and the material. This method, however, has often been unsatisfactory, for example, because of the difficulty to obtain a liquid having an appropriate density.

According to the present invention, particles to be classified are mixed with an electrically conducting fluid to form a dispersed system and an electric current is passed through the system while it is held in a magnetic field for the purpose of classifying the particles by their density.

Figure 1:
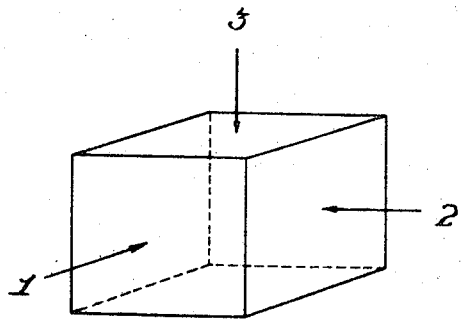
FIG. 1 is a perspective illustrating the principles of the invention.

As an example, separation of solid particles from molten metal having such particles admixed thereto will be explained. Assume that molten metal and two sorts of particles larger in density than the melt are contained in a vessel or container such as shown in FIG. 1. Assume further that both sorts of particles are electrically nonconducting and a magnetic field is applied in a direction indicated by the arrow 1 while an electric current is directed as indicated by the arrow 2. Without any magnetic field and electric current, the particles are deposited on the bottom of the vessel. However, a magnetic field and an electric current applied as described above coact to produce an electromagnetic force which acts downward upon the metal melt in a direction indicated by the arrow 3. The particles in the melt, being electrically non-conducting, conveys no electric current and is not subjected to any electromagnetic force. Actually, however, they are subjected to a substantial upward force since a pressure gradient is caused in the liquid not only by gravitation but also by the electromagnetic action both acting to cause a maximum pressure on the bottom of the vessel. As the intensities of the magnetic field and electric current are increased to increase the pressure gradient in the liquid, the particles will start to float. It will be recognized, therefore, that the particles in the liquid can be classified according to their density by properly controlling the magnetic field and the electric current to maintain a state in which lighter particles float while allowing heavier ones to remain deposited. In this connection, the condition required to start the particles to float is given by the following formula:

$$Bj = g(\rho_s - \rho) \quad (1)$$

where B represent the magnetic flux density in gauss, $j$ the current density in c.g.s. electromagnetic units, $\rho_s$ designates the density of the particulated material, $\rho$ the density of the electrically conducting fluid in grams per cubic centimeter, and $g$ the gravitational acceleration in centimeters per second.

In the event that the particulate material has a density lower than that of the liquid, either the magnetic field 1 (FIG. 1) or electric current 2 should be reversed in direction to cause an upwardly acting electromagnetic force to decrease the pressure gradient in the liquid and hence the buoyancy acting upon the particles so that heavier particles may descend to be separated out. In this case, the condition for starting the particles having a higher density to descent is given by the following formula:

$$Bj = g(\rho - \rho_s) \quad (2)$$

Figure 2:
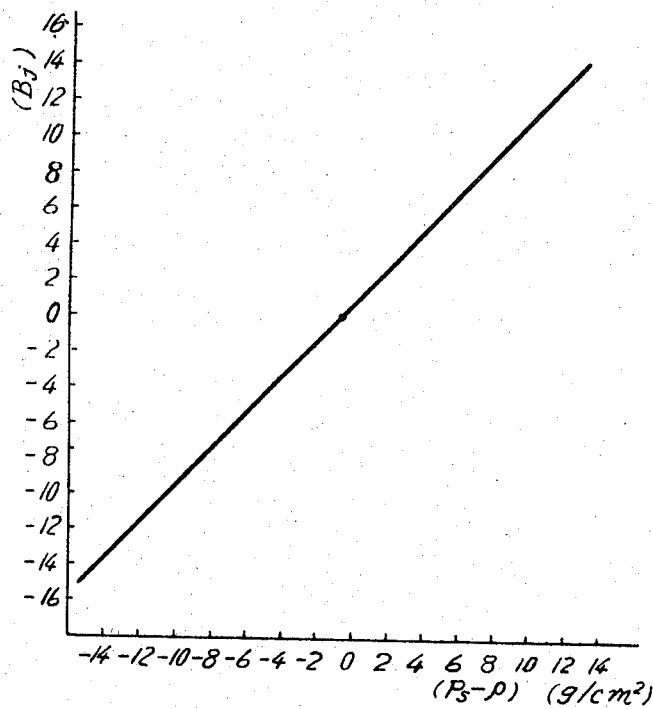
FIG. 2 is a graphical chart showing the relationship of the difference in density between the particulate material and fluid to the magnetic flux and current density in application of the present invention to the separation of particles.

These conditions for floating or depositing the particles are graphically illustrated in FIG. 2. In this figure, the minus sign of $Bj$ indicates that the direction of the current or the magnetic field is opposite to that indicated by the arrow 2 or 1 in FIG. 1.

In cases where the particles are electrically conducting, they also carry a current to undergo electromagnetic effect, which should be controlled properly. Where the currents carried by the particles widely differ in magnitude from each other, it may happen that, as the current being applied is increased, those particles having a higher density start to float in advance or those having a lower density start to deposit in advance. According to the present invention, therefore, particles can not only be classified according to their density but also by their electrical conductivity.

Figure 3:
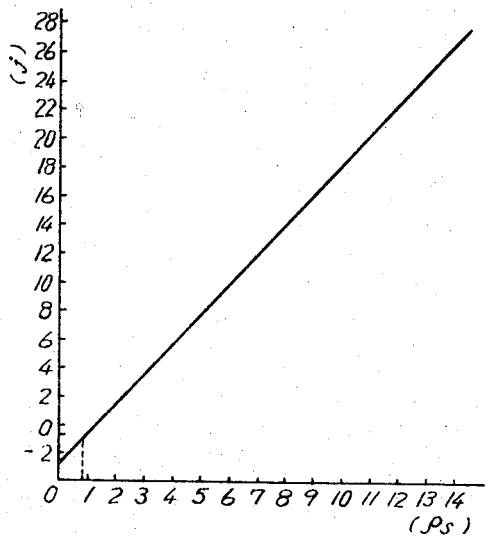
FIG. 3 is a chart similar to FIG. 2 in which NaK is employed as an electrically conducting fluid.

A practical example will next be described in which NaK or a mixture of 56% sodium and 44% potassium is employed as an electrically conducting fluid for classification of electrically non-conducting particles. When NaK is held at 50° C. (density 0.90 (g./cm.$^3$)) and the magnetic flux density is 5000 gauss, the condition for the particles to float or sink is graphically illustrated in FIG. 3. The positive current density in this figure corresponds to the magnetic field and electric current given in the directions indicated by the arrows 1 and 2 in FIG. 1 and the negative current density indicates that either the magnetic field or electric current is given in a direction opposite to that shown in FIG. 1. As will readily be observed from FIGS. 2 and 3, it is possible by properly controlling the magnetic flux density and the current density to cause those particles having a density higher or lower than any predetermined value to sink or float, respectively.

In the following example, oxide particles as a nuclear fission product contained in irradiated nuclear fuel substances are separated from particles of uranium and plutonium oxides.

As shown in Table 1, which follows, most of the oxides as a nuclear fission product have a density of less than 6 g./cm.$^3$ while uranium and plutonim oxides have a density exceeding 7 g./cm.$^3$. Accordingly, as will be noted from FIG. 3, by passing an electric current of a density of 12 a./cm.$^2$ while maintaining a magnetic flux density of 5000 gauss, it is possible to cause only the oxides as a nuclear fission product to float so that they may be separated from uranium and plutonium oxides.

Figure 4:
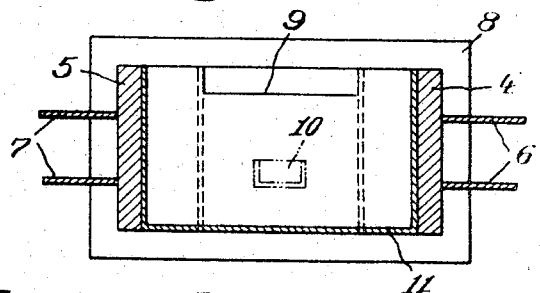
FIGS. 4 and 5 illustrate one form of apparatus for carrying out the separation of particles.
Figure 5:
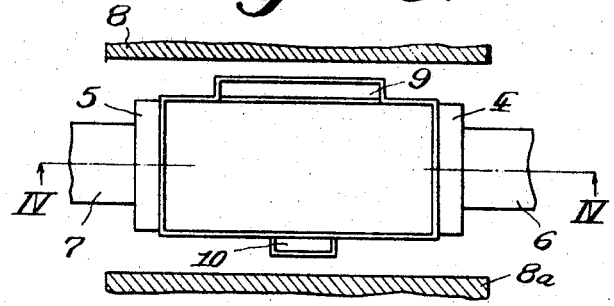

Such separation can be performed by use of a classifying apparatus illustrated in FIGS. 4 and 5. The apparatus includes a liquid holding tank 11 made of stainless steel and electrode structures are secured to the opposite sides of the tank each of which includes a thick copper plate 4 or 5 bonded to the adjacent wall of the tank and bus bars 6 or 7 brazed to the plate. The magnet used is a D.C. electromagnet including pole pieces 8 and 8a each dimensioned 140 x 80 mm. and spaced apart from each other by a distance of 86 mm. and produces a magnetic flux density of 5000 gauss. The liquid tank 11 is 50 mm. wide, 100 mm. long and 60 mm. high with a notch 9 of 60 mm. width formed in one of the longitudinal walls of the tank to a depth of 10 mm. to serve as an overflow. A feed port 10 is formed in the opposite wall at a level of approximately 20 mm. NaK containing the particles is filled in the tank through feed port 10 to a depth of approximately 50 mm. and a current of 300 a. (having a density of 12 a./cm.$^2$) is maintained through the melt until the oxide particles as a nuclear fission product alone rise to the surface. Then further NaK is fed through port 10 to raise the liquid level in the tank so that the particles afloat on the surface flow out through the overflow port 9. Subsequently, the current is raised to 690 a. or to a density of 27.6 a./cm.$^2$ to cause all particles having a density of 15 g./cm.$^3$ or under to float. Apparently, uranium and plutonium oxides are thus caused to rise to the surface and can then be removed out of the tank through the overflow 9.

In this manner, particles having different densities can be classified or separated from each other by separately removing them from the fluid in accordance with their respective densities. Incidentally, it is noted that the classifying process involves an electric power consumption in the form of Joule heat developing in NaK, which is extremely small, say, about 6 watts for the current input of 690 a.

TABLE 1.—DENSITIES OF OXIDES IN IRRADIATED NUCLEAR FUEL SUBSTANCES

| Oxides of nuclear fission products: | Density, g./cm.$^3$ |
|---|---|
| $ZrO_2$ | 5.49 |
| $SrO$ | 4.7 |
| $MoO_3$ | 4.5 |
| $RuO_4$ | 3.29 |
| $TeO_2$ | 5.67 |
| $Cs_2O$ | 4.36 |
| Uranium and plutonium oxides | Density g./cm.$^3$ |
| $UO_2$ | 10.9 |
| $UO_3$ | 7.29 |
| $UO_8$ | 7.31 |
| $PuO_2$ | 11.5 |

II.—Purification of molten metal

Oxides, bubbles or the like matter included in molten metal impair the quality of secondary products if they remain in the metal when it solidifies into an ingot or other casting. This necessitates removal of such oxides, bubbles, etc. from the metal during its melting or solidification. Various methods have previously been proposed for their removal but ingots or castings obtained by these methods have not always been satisfactorily high in quality.

According to the present invention, impurities such as oxides and bubbles contained in molten metal can be removed therefrom with ease, as will be described below.

Molten metal is placed in a vessel such as shown in FIG. 1 and, as in the case of classification of particles described above (I), the melt is placed in a magnetic field acting in a direction indicated by the arrow 1 and an electric current directed through the melt in a direction indicated by the arrow 2 to cause an electromagnetic force in the direction of the arrow 3, which forms a pressure gradient in the molten metal in the same direction, producing a pressure which increases from top to bottom of the molten metal mass. Where the oxides, gases or other substances included in the molten metal have a very low electrical conductivity, they are not subjected to any electromagnetic force and, because of the pressure gradient formed in the melt, are moved upwardly or in a direction opposite to that of the electromagnetic force acting upon the molten metal. Though the system is apparently subjected to some gravitational effect, this effect can be practically eliminated by increasing the total pressure gradient caused under the electromagnetic action to a value much higher than that caused by gravitation and thus the impurities can be moved at a speed far exceeding that at which they sink or float under gravity alone.

Figure 6:
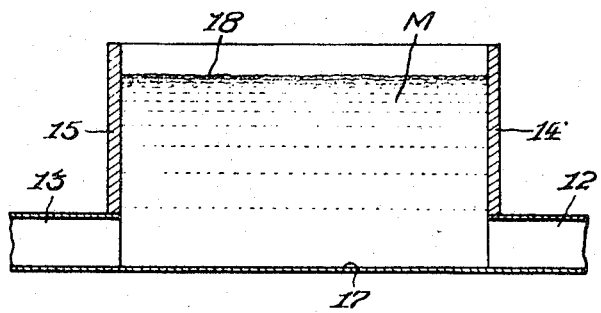
FIG. 6 is a diagrammatic front sectional elevation of an apparatus for purification of molten metal as a further application of the inventive method.

FIG. 6 illustrates an apparatus for purifying molten metal according to the above method in vertical cross section. As shown, the apparatus has an inlet port 12, through which molten metal including impurities is fed, and an outlet port 13, through which the purified molten metal is discharged. A magnetic field is formed to act perpendicularly to the sheet of FIG. 6 and an electric current is directed between electrodes 14 and 15. The directions of the magnetic field and electric current are determined so as to cause an electromagnetic force acting toward the bottom 17. The magnetic field and the electric current may both be direct-current or alternating-current.

The pressure of molten metal will be the highest on the bottom surface 17 of the apparatus since the pressure gradient obtained in the melt M under the electromagnetic force acts vertically downwardly. As the pressure gradient is increased with the electromagnetic force the impurities having a low electric conductivity, such as oxides and gases included in the melt are moved upwardly to the surface 18 even if they have a density higher than the molten metal and can be scraped off at appropriate time intervals. This apparatus can be operated in a continuous fashion and in this case the molten metal fed through the inlet port 12 will be cleared of the impurities before it reaches the outlet 13.

Experiments in this process conducted with molten aluminum will next be described. In general, molten aluminum includes various oxides such as $Al_2O_3$ (corundum, density 3.95 to 4.10 g./cm.$^3$), $Al_2O_3 \cdot MgO$ (spinel, density 3.5 g./cm.$^3$), and $SiO_2$ (quartz, density 2.65 g./cm.$^3$). These oxides are usually found suspended in molten aluminum because of their limited difference in density from aluminum, which has a density of 2.36 g./cm.$^3$ at 720° C. Sometimes, gas bubbles are also found in molten aluminum.

Figure 7:
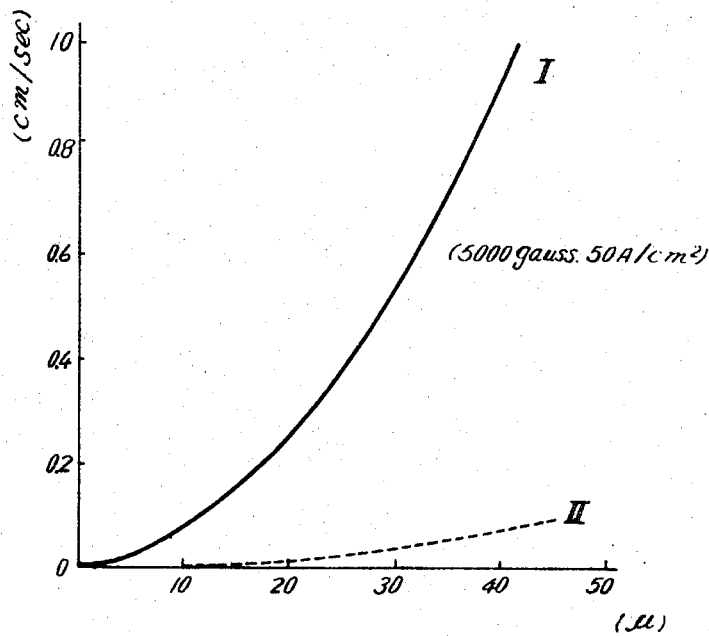
FIG. 7 is a graphical chart showing the relationship between the size of particles contained in the molten metal and the speed of separation in the purification process.

An apparatus of the same form as the one shown in FIG. 6 was employed to purify molten aluminum including such impurities at a temperature of about 720° C. The purifying tank had a length or an interelectrodic distance of 300 mm., a height of 90 mm. and a width of 100 mm., including electrodes and bottom and side plates all formed of copper. The electrodes were relatively thick copper plates, and inlet and outlet ports for molten aluminum were formed in the bottom portions of the respective electrodes, which were of comblike configuration, A D.C. electromagnet was used which was of the water-cooled type and included a winding connected in series with the current passing through the interior of the tank. The distance between the polepieces of the magnet was 150 mm., each of the polepieces being dimensioned 350 mm. x 140 mm. When the current was 4500 A., the magnetic flux in the tank was 5000 gauss. With this current, a downward electromagnetic force acted upon the molten aluminum in the tank to cause a pressure gradient therein, the current density through the melt being 50 A./cm.$^2$. Apparently this pressure gradient, 25.5 g./cm.$^2$/cm. in magnitude, was added to the pressure gradient due to gravity, which was 2.36 g./cm.$^2$/cm., to produce a total pressure gradient of 27.9 g./cm.$^2$/cm. Because of this magnitude of pressure gradient, particles of $Al_2O_3$, etc. rose to the surface against the gravity. The rising velocity of $Al_2O_3$ particles, assumedly being spherically shaped, was calculated to obtain a velocity curve I shown in FIG. 7. It is clearly indicated that the velocity of particles is much higher than their velocity of precipitation under gravity (curve II).

It has been found that when molten aluminum is treated in this apparatus at a rate of 0.5 liter per minute it can be practically completely cleared of those oxide particles which are 15$\mu$ or over in diameter as well as of gas bubbles, and that smaller particles can be separated if the rate of melt feed is reduced.

With the current of 4500 a., the electric power consumed as Joule heat in the molten aluminum was approximately 150 watts and the temperature rise of the melt was thus very limited.

As will be appreciated from the foregoing description, in the manufacture of ingots or other catstings, impurities such as oxides and gas bubbles included in the molten metal can be separated therefrom efficiently and in a continuous fashion by the method of the present invention.

III.—Manufacture of ingots and other castings

Various defects of metal ingots and other castings including cavities and pin holes are attributable to gases released during solidification of the melt and different nonmetallic inclusions therein. For example, in aluminum melts are included hydrogen gas and oxides such as $Al_2O_3$, $Al_2O_3 \cdot MgO$ and $SiO_2$. Because of its solubility in aluminum, hydrogen gas is released from the melt as it solidifies and thus is liable to form gas holes in the ingot or the like. On the o her hand, the oxides differing only slightly in density from molten aluminum are suspended therein and thus are liable to remain in the ingot or other casting obtained. By applying the principles of the present invention to the cas'ing of ingots and the like, inclusions such as gases and oxides in the melt can be positively separated therefrom to obtain a sound ingot or other casting.

For instance, ingots having a rectangular cross section can be made according to the present invention in the following manner. For convenience, assume that FIG. 1 illustrates a mold used for the making of ingots. With molten metal placed in the mold, a magnetic field is applied thereto in the direction of the arrow 1 and an electric current is passed through the metal in the direction of the arrow 2 so that interaction of the magnetic field and the current causes an electromagnetic force which acts in the direction of the arrow 3 to form in the melt a pressure increasing vertically downwardly. Since substantially no electric current is carried by the gases, oxides and other impurities having a very low electric conductivity, such impurities are not subjected to any downward force but are driven upwardly. (If these impurities have a specific gravity greater than that of the molten metal, they apparently tend to descend under gravity. Even such substances, however, can be moved upwardly by sufficiently increasing pressure gradient electromagnetically.) Thus, gas bubbles, oxides and other impurities are collected on the top surface of the melt under the electromagnetic effect and its top region including such impurities can readily be removed during or after solidification of the melt.

To remove any gas released from the melt in the course of its solidification, the melt is preferably cooled at the bottom so that solidification proceeds gradually upward from the bottom. In this manner, gases released from the melt as it solidifies are driven upwardly through the melt because of the substantial pressure gradient caused therein under the electromagnetic effect and an ingot practically free from a D.C. or A.C. magnetic defects results. In this application, either a D.C. or A.C. magnetic field and electric current may be employed just as in the preceding examples. Where the magnetic field and electric current used are of the alternating character, they must apparently be controlled to be in phase with each other.

One practical example of making aluminum ingots by the inventive method will next be described.

Figure 8:
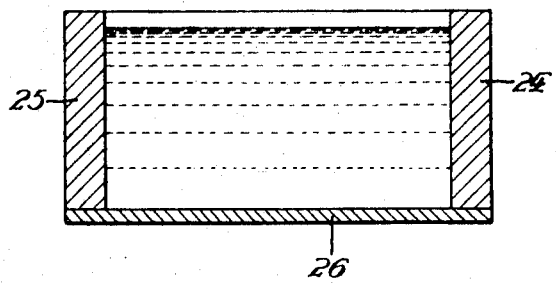
FIG. 8 is a vertical cross-sectional view of a mold usable in casting ingots or the like according to the present invention.
Figure 9:
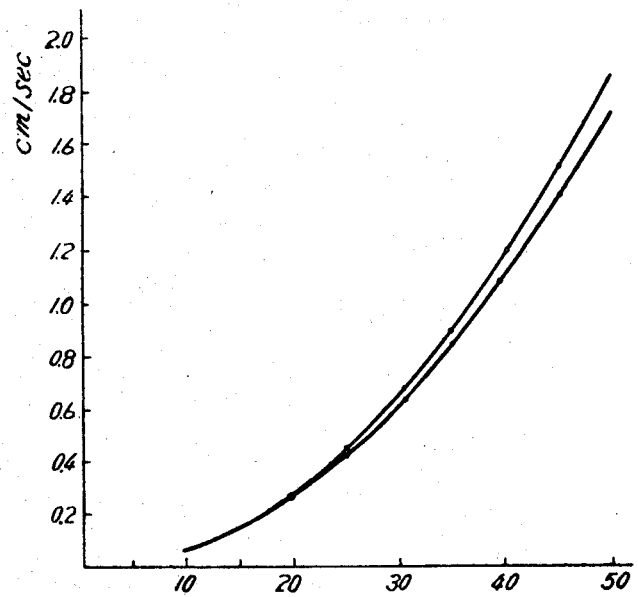
FIG. 9 is a graphical chart illustrating the relationship between the size of oxide particles or gas bubbles in the melt and their rising velocity.

In FIG. 8, illustrating the mold used in cross section, reference numerals 24 and 25 indicate respective electrodes having a width of 60 mm. and a height of 100 mm. The mold 26 is made of copper having an interelectrodic distance of 200 mm. Aluminum melt is filled in the mold to a depth of approximately 90 mm. to obtain an ingot dimensioned 60 x 200 x 90 mm. The magnetic field is formed by a water-cooled D.C. electromagnet having polepieces spaced apart from each other by a distance of 110 mm. and each dimensioned 140 x 250 mm. and has in the mold a uniform flux density of 5000 gauss. With an electric current of 5400 a. passing through the melt (the current density being 100 a./cm.$^2$), a pressure gradient of 0.05 kg./cm.$^2$/cm. is formed under the electromagnetic effect, producing a highest pressure at the bottom. (The directions of the magnetic field and the current are the same as shown in FIG. 1.) This pressure gradient is more than twenty times as large as that caused by gravity and causes oxides, gas bubbles and other impurities included in the melt to rise at a substantial velocity. The rising velocities of the oxide particles and gas bubbles calculated under the assumption that they be spherical in shape are shown in FIG. 9 and are more than twenty times as high as those obtained under gravity alone. When the melt solidifies starting at the bottom, the impurities such as oxides and gas bubbles having a rising speed higher than the speed at which the solidification of the melt proceeds can all rise to its surface and can be removed from the ingot obtained. For example, where the speed of solidification is 0.1 cm./sec., all oxides and gas bubbles of approximately 10$\mu$ or over can be removed in this manner. In this case, the electric power consumed as Joule heat in the melt amounts only to approximately 0.2 kilowatt.

Castings of relatively complicated configuration can be obtained by employing a particularly designed mold in place of one having a simple configuration as disclosed hereinbefore. For this purpose, the mold is preferably made of a material having an electrical conductivity substantially the same as that of the molten metal to allow the current applied to pass through the melt and has formations such as apertures for separation of gases, oxides and other impurities from the melt.

According to the method of the present invention, it will be appreciated from the foregoing that in the manufacture of ingots and other castings the impurities in the molten metal such as nonmetallic and gaseous inclusions can be pushed out in a direction in which the melt pressure decreases in accordance with the substantial pressure gradient caused electromagnetically and thus a sound product free from defects such as blow holes can be obtained.

IV.—Boiling of liquids

Boiling heat transmission, namely, heat transmission from a solid surface to liquid in contact therewith which includes a phase change from liquid to vapor on the solid surface or in the liquid, is employed in various forms of apparatus. In this case, as the temperature of the solid surface is elevated, vapor bubbles increase in number in the vicinity of the solid surface until the individual bubbles are united to form a continuous film of vapor, so that the coefficient of heat transfer from the solid surface to the liquid is suddenly reduced. This is a phenomenon commonly called film boiling. Where the solid surface includes a self-heating system such as one which generates heat through electrical resistance or nuclear fission reaction, the sudden reduction in the heat-transfer coefficient causes a so-called burnout or melting of the solid surface to failure. The rate of heat generation per unit area of the solid surface when such burnout occurs is called burn-out heat-flux.

Increase in burn-out heat flux with its advantageous effects can be obtained by applying the present invention to such boiling of liquids to accelerate separation of vapor bubbles from the solid surface or its vicinity under the effect of electromagnetic force upon the liquid.

An apparatus usable for this purpose will next be outlined. First with reference to FIG. 10, assume that liquid metal is flowing through a passage defined by one heating surface 31 and three non-heating surfaces 32, 33 and 34 and is heated by the heating surface 31 to boil, bubbles forming at active nuclei on the surface.

In this case, when a magnetic field is applied in a direction from surface 32 to surface 34 as indicated by the arrow the liquid metal is subjected to an electromagnetic force acting in the direction from surface 33 to surface 31 to cause a pressure gradient in the liquid metal. This makes the liquid pressure the highest on surface 31 and the lowest on surface 33. Vapor bubbles formed in the liquid metal, being electrically a bad conductor, remain free from any electromagnetic effect and due to the pressure gradient in the liquid are moved away from the heating surface 31 toward the surface 33. This accelerates separation of the vapor bubbles forming in the boiling liquid from the heating surface 31 or its vicinity so that their union and resulting abrupt reduction in the heat-transfer coefficient are effectively prevented to increase the burn-out heat flux.

Further, under such electromagnetic effect, the vapor bubbles and the liquid are readily separable from each other to form a fluid system including a separated gaseous phase, as shown in FIG. 11. Thus, it is expected that the entire system assumes a relatively stable fluid state. In FIG. 11, reference numeral 31 indicates a heating surface, 33 a wall of the fluid passage, 35 vapor bubbles, 36 liquid, and 37 a vapor phase separated from the liquid phase. In this case, the liquid can also be heated to some extent by any of the wall surfaces of the passage other than the heating surface. In the state shown in FIG. 11, the vapor 37 can be superheated by heating the surface 33 also.

The above procedure may also be applied to so-called pool boiling or boiling of a pool of liquid. In this procedure, it is to be noted that the temperature of the liquid mass itself can be at or below the saturation point.

This procedure can be employed advantageously with liquids having a low electric resistivity so as not to generate any excessive heat by Joule's law when conducting a substantial current. Again, the magnetic field and electric current applied may be direct-current or alternating-current in character.

FIG. 12 illustrates one form of steam-generating unit including the heat-transferring system of the present invention. Reference numeral 41 indicates a heating element supported by a heater support 42. Electrically conducting liquid is fed into the apparatus through an inlet port 43 and an electric current is passed between two electrodes 44 and 45 as indicated by the arrow C.

Assuming a magnetic field acting perpendicularly to the sheet of FIG. 12 from back to front thereof, the electromagnetic force produced is directed toward the heater surface throughout the cross section as the direction of current is reversed in the top and the liquid pressure under the electromagnetic effect is the highest on the surface of heater 41. Vapor bubbles formed are moved toward the outer wall 48 while growing due to the pressure gradient until they are released from the liquid phase. This free vapor 49 rises along the outer wall 48 and then discharged through vapor outlet 40.

By way of example, design calculation for the boiling of liquid sodium will next be illustrated. Assume that liquid sodium held in the apparatus of FIG. 12 boils under a pressure of approximately one atmospheric pressure at a temperature of approximately 880° C. To the liquid is applied an electromagnetic force by cooperation of a magnetic field of the flux density of 5000 gauss and an electric current of the density of 100 a./cm.² to cause a pressure gradient of 0.05 kg./cm.²/cm. at right angles to the heater surface so that the highest pressure is obtained thereon. This magnitude of the pressure gradient is approximately seventy times as large as that obtained under gravity alone and vapor bubbles can be moved apart from the heater surface at a velocity considerably higher than the rising speed obtained under gravity alone. This high velocity of bubble movement naturally reduces the amount of vapor per unit volume of space and increases the burn-out heat flux to a value about three times as high as that obtainable with a horizontal heater surface under gravity alone. The rate of electric power consumption for heat generation reaches at most approximately 5 kilowatts per liter of boiling sodium. This figure is considerably small as compared to the rate of heat transmission for the boiling, which amounts to the highest of approximately 500 kilowatts per liter of boiling sodium (assuming the distance of 10 mm. between the heater surface and the outer wall).

As apparent from the foregoing, when an appropriate electromagnetic force is applied an electrically conducting liquid while it is boiling to cause a substantial pressure gradient therein, vapor bubbles are driven in the direction of decreasing pressure due to such pressure gradient and thus various advantages can be obtained from the viewpoint of heat transfer and fluid flow, including increase in burn-out heat flux and stabilization of fluid movement.

What is claimed is:
1. A method of classifying different specific gravity particles of oxides of a nuclear fission product comprising forming a continuous phase of electrically conducting liquid from a mixture of molten sodium and potassium and dispersing in such continuous phase the oxides resulting from nuclear fission and including uranium oxides and plutonium oxide and lighter oxides, subjecting the mixed phase fluid to a horizontally directed magnetic field and passing a horizontally directed electric current through the fluid in perpendicular relation to said magnetic field to cause an electromagnetic effect in a vertical direction that acts upon the fluid in such a manner that the dispersed phase can be moved relative to the continuous phase and wherein the action upon the uranium and plutonium oxides can differ from the action on the remaining and lighter oxides in the nuclear fission product so that initially the lighter oxides float, removing the float fractions of the oxides and obtaining the heavier oxides from the continuous phase by increasing the density of the flow of electric current to the mixed phase fluid so as to provide for the flotation of higher weight oxides, and removing such float fraction to recover the heavier oxides therefrom.

References Cited

UNITED STATES PATENTS

| | | | |
|---|---|---|---|
| 438,579 | 10/1890 | Faunce et al. | 204—186 X |
| 531,118 | 12/1894 | Harris | 209—215 X |
| 531,183 | 12/1894 | Harris | 204—186 X |
| 1,034,787 | 8/1912 | Greene | 75—93 X |
| 1,405,128 | 1/1922 | Harris | 209—214 |
| 1,949,660 | 3/1934 | Roberts | 210—223 X |
| 2,013,653 | 9/1935 | Hoke | 75—93 |
| 2,166,671 | 7/1939 | Trofimov | 75—93 |
| 2,652,925 | 9/1953 | Vermairen | 210—222 |
| 2,875,108 | 2/1959 | Pfann | 75—93 X |
| 3,140,714 | 7/1964 | Murphy et al. | 204—180 X |
| 3,207,684 | 9/1965 | Dotts | 204—180 |
| 2,866,702 | 12/1958 | Batutis et al. | 75—66 X |
| 2,996,375 | 8/1961 | Wolkoff | 75—66 |

L. DEWAYNE RUTLEDGE, Primary Examiner

H. W. TARRING, Assistant Examiner

U.S. Cl. X.R.

75—66, 93; 164—49; 204—186; 209—179, 214, 215; 210—222